United States Patent
Rahman et al.

[11] Patent Number: 6,044,088
[45] Date of Patent: Mar. 28, 2000

[54] SYSTEM AND CIRCUIT FOR TELECOMMUNICATIONS DATA CONVERSION

[75] Inventors: Mohammad A. Rahman, Dallas; Dwight K. Patterson, Richardson; Gregory L. VanDePutte, Sachse; Michael J. Hanlon; Nader Sabzevari, both of Plano, all of Tex.

[73] Assignee: Alcatel USA Sourcing, L.P., Plano, Tex.

[21] Appl. No.: 08/940,476

[22] Filed: Sep. 30, 1997

[51] Int. Cl.[7] .................. H04J 3/16; H04J 3/12; H04L 12/28

[52] U.S. Cl. .......... 370/465; 370/522; 370/535; 370/907

[58] Field of Search ................... 370/465, 466, 370/467, 538, 539, 541, 907, 522, 535, 916, 504, 505, 506, 217, 225, 228

[56] References Cited

U.S. PATENT DOCUMENTS

| | | | |
|---|---|---|---|
| 4,967,405 | 10/1990 | Upp et al. | 370/465 |
| 5,185,736 | 2/1993 | Tyrrell et al. | 370/509 |
| 5,267,239 | 11/1993 | Pospischil et al. | 370/539 |
| 5,299,234 | 3/1994 | Nakagawa et al. | 370/466 |
| 5,392,284 | 2/1995 | Sugiyama | 370/538 |
| 5,436,890 | 7/1995 | Read et al. | 370/468 |
| 5,675,580 | 10/1997 | Lyon et al. | 370/503 |

FOREIGN PATENT DOCUMENTS

9605667  2/1996  WIPO .............. H04J 3/08

*Primary Examiner*—Alpus H. Hsu
*Assistant Examiner*—Afsar M. Qureshi
*Attorney, Agent, or Firm*—Baker Botts L.L.P.

[57] ABSTRACT

A data conversion circuit is provided. The data conversion circuit includes a transceiver that can receive a first data channel in a first or second data format and convert it into a second data channel having a third data format. The transceiver can also receive data from the second data channel in the third data format and convert it into the first data channel in the first or second data format. The data conversion circuit includes a bus interface that is connected to the transceiver. The bus interface transfers data between the transceiver and a bus control module. The data conversion circuit also includes an onboard controller interface that is connected to the bus interface. The onboard controller interface transfers data between the transceiver and an onboard controller.

37 Claims, 4 Drawing Sheets

SYSTEM AND CIRCUIT FOR TELECOMMUNICATIONS DATA CONVERSION

TECHNICAL FIELD OF THE INVENTION

The present invention relates in general to telecommunications data switching and more particularly to a circuit, system, and method for converting telecommunications data for use with telecommunications equipment.

BACKGROUND OF THE INVENTION

Modern telecommunications systems typically utilize digitally encoded data instead of analog data. If analog data is used, it may be converted to digital data for the purposes of switching the data between conducting media. Switching of data occurs at large telecommunications switches, which may receive and process hundreds or thousands of data channels.

One method of carrying a large number of data channels comprises encoding the data into an optical signal. A single optical fiber has a greater usable bandwidth, occupies less physical space, and may have a lower cost than most electrical conductors. Nevertheless, the data encoded into the optical signal carried by an optical fiber must be converted into data encoded into an electrical signal before the data can be processed for use in telecommunications applications.

Because optical fiber signals and other signals may be transmitted from many different locations with varying data formats, such signals must be switched and transmitted by equipment that is configured to handle data in the appropriate format. This requirement inhibits the flexibility for data switching and transmission for all signals, and optical signals in particular.

SUMMARY OF THE INVENTION

Therefore, a need has arisen for a circuit, system, and method for converting data that allows data of differing formats to be switched and transmitted.

In accordance with the present invention, a system, circuit, and method for data conversion is provided that substantially eliminates or reduces disadvantages and problems associated with previously developed data conversion systems, circuits, and methods.

One aspect of the present invention is a data conversion circuit. The data conversion circuit includes a transceiver that can receive a first data channel in a first or second data format and convert it into a second data channel having a third data format. The transceiver can also receive data from the second data channel in the third data format and convert it into the first data channel in the first or second data format. The data conversion circuit includes a bus interface that is connected to the transceiver. The bus interface transfers data between the transceiver and a bus control module. The data conversion circuit also includes an onboard controller interface that is connected to the bus interface. The onboard controller interface transfers data between the transceiver and an onboard controller.

One important technical advantage of the present invention is a data conversion circuit that can receive an STS-1-P data stream with either an embedded DS3 or VT1.5 format, and can generate a DS0 data stream from the STS-1-P data stream. The data conversion circuit of the present invention thus provides for increased flexibility in handling data from different sources.

Another important technical advantage of the present invention is a method for converting data that allows a data stream having an STS-1-P format to be received and converted into DS0 data, regardless of whether the STS-1-P data includes an embedded DS3 or VT1.5 data format. The method for converting data of the present invention thus provides for increased flexibility in handling data from different sources.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Preferred embodiments of the present invention are illustrated in the figures, like numbers being used to refer to like and corresponding parts of the various drawings.

Figure 1:
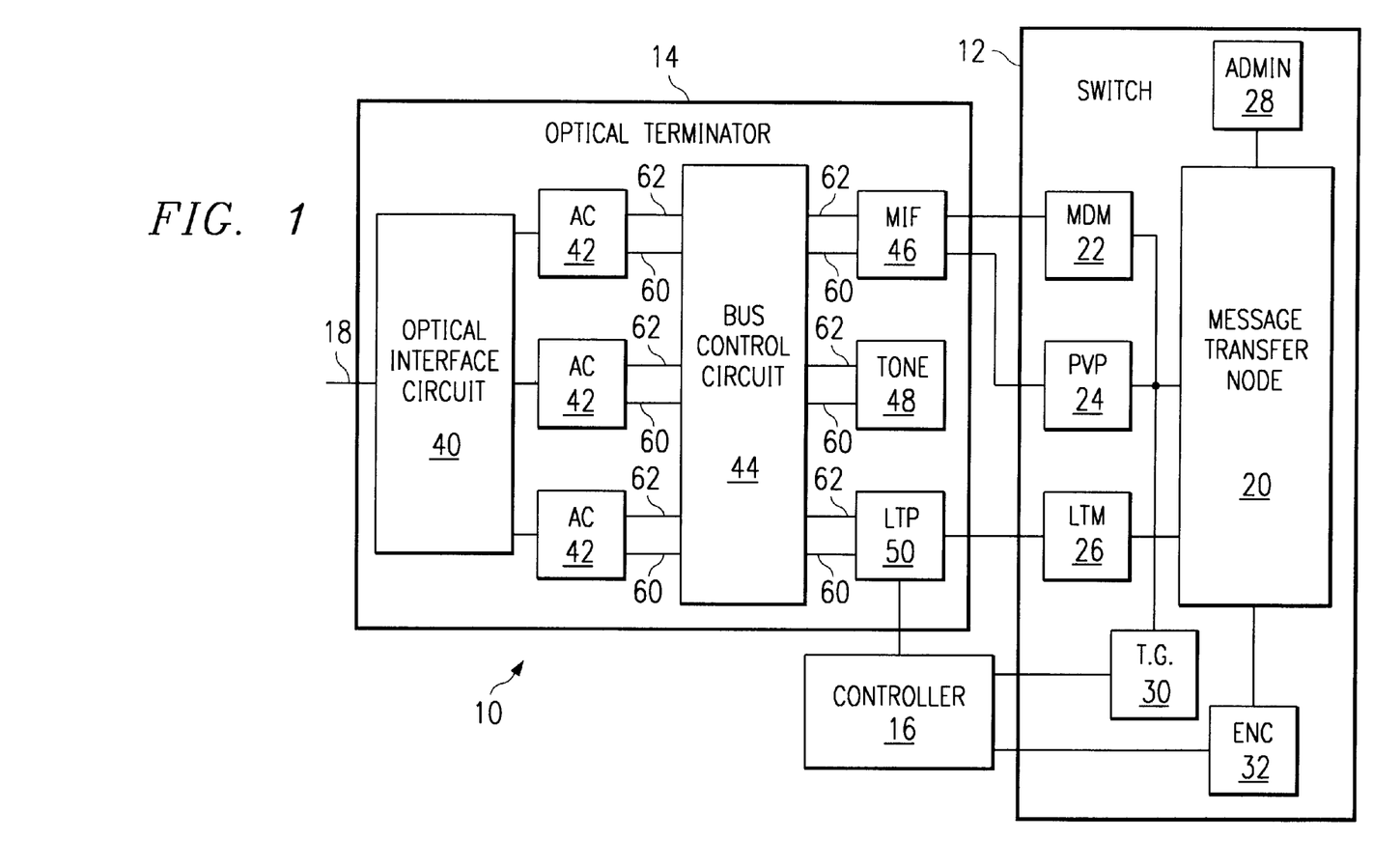
FIG. 1 illustrates a fiber optic termination module for a telecommunications switch embodying concepts of the present invention.

FIG. 1 is a system diagram of optical fiber-capable telecommunications switch system 10. Optical fiber-capable telecommunications switch system 10 includes switch 12 connected to fiber optic connection unit 14 and common controller 16. Optical telecommunications data streams, such as a stream of bit-serial data, byte-serial data, or serial frames of data, are received over one or more optical fibers 18 at fiber optic connection unit 14. These telecommunications data streams are converted to electrical signals by fiber optic connection unit 14 and are transmitted to switch 12 for switching between data channels. Switch 12 may switch data channels of any suitable size, such as DS0, DS1, DS3, or other suitable channels. Common controller 16 receives control data from and transmits control data to fiber optic connection unit 14 and switch 12.

Switch 12 is a telecommunications switch having M input channels and N output channels, where M and N are integers. Switch 12 receives telecommunications data at any of the M input channels and to transfer the telecommunications data to any of the N output channels. Switch 12, as shown in FIG. 1, is a digital switch, but may also be an analog switch. Switch 12 may include, for example, a Megahub 600E Digital Telecommunications Switch manufactured by DSC Communications Corporation of Plano, Tex. Switch 12 includes a message transport node 20 coupled to a matrix data multiplexer circuit (MDM) 22, a matrix control path verification processor (PVP) 24, a line trunk manager circuit (LTM) 26, administration circuit (ADMIN) 28, timing generator circuit (TG) 30, and Ethernet network circuit (ENC) 32.

Matrix data multiplexer circuit 22 is further coupled to matrix control path verification processor 24 and timing generator circuit 30. Matrix data multiplexer circuit 22 is an interface circuit that may be used for coupling data streams between fiber optic connection unit 14 and the switching matrix (not explicitly shown) of switch 12. In particular, matrix data multiplexer circuit 22 provides the interface for DS0 data. Matrix data multiplexer circuit 22 receives 2048 channels of DS0 data from fiber optic connection unit 14 on a 10-bit parallel data channel operating at a frequency of 16.384 MHZ. These DS0 data channels are then transmitted to the M input ports of the switching matrix of switch 12.

Control commands received at switch 12 from common controller 16 are used to determine the proper connections between the M input ports and the N output ports of the switching matrix. The DS0 data channels are transmitted through the switching matrix after the connections have been formed. The DS0 data channels received at matrix data multiplexer circuit 22 from the N output ports of the switching matrix are then transmitted back to fiber optic connection unit 14.

Matrix control path verification processor 24 is coupled to fiber optic connection unit 14 and to message transport node 20. Matrix control path verification processor 24 is a switching matrix administration and control component that processes matrix channel low level fault detection and fault isolation data.

Line trunk manager circuit 26 is coupled to fiber optic connection unit 14 and message transport node 20. Line trunk manager circuit 26 is a switching matrix control component that receives and transmits data relating to call processing functions for fiber optic connection unit 14.

Timing generator circuit 30 is coupled to matrix data multiplexer circuit 22 and common controller 16. Timing generator circuit 30 is a switch timing circuit that receives timing data from an external source, such as fiber optic connection unit 14, and transmits the timing data to components of switch 12.

Ethernet network circuit 32 is coupled to message transport node 20 and common controller 16. Ethernet network circuit 32 is a data communications interface, and transfers data between message transport node 20 and common controller 16.

Fiber optic connection unit 14 includes an optical interface circuit 40, application circuits (AC) 42, a bus control circuit 44, a matrix interface circuit (MIF) 46, a tone recognition circuit (TONE) 48, and a high speed line trunk processor circuit (LTP) 50. Fiber optic connection unit 14 receives digitally encoded optical data from optical fiber 18, performs broadcast switching of the data channels received from optical fiber 18, transmits synchronous transfer mode (STM) telecommunication data to matrix data multiplexer circuit 22 and matrix control path verification processor 24 for switching through the switching matrix of switch 12, and receives the switched telecommunications data from switch 12 for transmission over optical fiber 18.

Optical interface circuit 40 is capable of terminating optical signals, for example OC-3, connected to the public switched network (PSN). Optical interface circuit 40 receives digitally encoded optical telecommunications data from optical fiber 18 and converts the optical signals into electrical signals, for example STS-1, for transmission to other components of fiber optic connection unit 14. Optical interface circuit 40 is coupled to optical fiber 18 and to application circuits 42. Optical interface circuit 40 may include a single circuit card with electronic circuit subcomponents (not explicitly shown) that have plug-in connectors to allow the card to be easily installed in a cabinet containing other component circuit cards of fiber optic connection unit 14. Alternatively, optical interface circuit 40 may include two or more circuit cards, or one or more discrete components on a circuit card.

Application circuits 42 are telecommunications data transmission system components which are coupled to bus control circuit 44. Each application circuit 42 may have a separate circuit card (not explicitly shown) with plug-in connectors in order to be easily installed in a rack containing fiber optic connection unit 14. Alternatively, application circuits 42 may include multiple circuit cards, or individual components on a single circuit card.

As shown in FIG. 1, application circuits 42 are configured to receive data from and transmit data to optical interface circuit 40. This data may comprise synchronous transfer mode telecommunications data. For example, application circuits 42 may receive a single STS-1-P stream of data that includes a plurality of DS0 data channels, where each DS0 data channel is a continuous stream of data equal to 64,000 bits per second. This data would be received in a predetermined format that may include administration data, control data, routing data, and payload data. The administration data, control data, and routing data is used to separate the individual DS0 data channels within the STS-1-P data stream, and the payload data comprises the actual data carried in each individual DS0 data channel.

Application circuits 42 may also receive asynchronous transfer mode (ATM) telecommunications data. Asynchronous transfer mode data may be transmitted as a single stream of fixed bit format data frames that comprise additional streams of data. The number of data frames transmitted per second for a given data stream may be varied for asynchronous transfer mode data in order to accommodate fluctuations in the amount of data per stream and the number of data streams transferred.

Bus control circuit 44 may be coupled to a number of other application circuits with more specific functions, such as matrix interface circuit 46, tone recognition circuit 48, and high speed line trunk processor circuit 50. Nevertheless, the common characteristic of application circuits 42 is that they are operable to transmit data to bus control circuit 44 over ingress buses 60 and to receive data from bus control circuit 44 over egress buses 62.

Bus control circuit 44 receives telecommunications data from application circuits 42 over ingress buses 60, multiplexes the data into a single broadcast data stream, and transmits the broadcast data stream over egress buses 62. In this manner, bus control circuit 44 also operates as a broadcast switching device. Each application circuit 42 receives the broadcast data stream containing data from other application circuits, and can then process the data or transfer the data back to optical interface circuit 40 for transmission on optical fiber 18 to the network. Bus control circuit 44 may be a separate circuit card with plug-in connectors in order to be easily used in a rack containing fiber optic connection unit 14. Alternatively, bus control circuit 44 may include multiple circuit cards, or individual components on a single circuit card.

Matrix interface circuit 46 provides the protocol and transport format conversion between fiber optic connection unit 14 and switch 12. Matrix interface circuit 46 is an application circuit that is used to transmit data received from the broadcast data stream transmitted by bus control circuit 44 to switch 12. Matrix interface circuit 46 is coupled to bus control circuit 44, matrix data multiplexer circuit 22, and matrix control path verification processor 24. Matrix interface circuit 46 converts the data format of the broadcast data stream received from bus control circuit 44 and switch 12 into a data format that is compatible with switch 12 and bus control circuit 44, respectively. Matrix interface circuit 46 may be a separate circuit card with plug-in connectors in order to be easily used in a rack containing fiber optic connection unit 14. Alternatively, matrix interface circuit 46 may include multiple circuit cards, or individual components on a single circuit card.

Tone recognition circuit 48 is an application circuit that is coupled to bus control circuit 44 and performs tone recognition functions for fiber optic connection unit 14. One pair of tone recognition circuits 48 may be required for every 2016 matrix ports of switch 12. Tone recognition circuit 48 interfaces with the broadcast data stream and detects data representative of keypad tones on each DS0 channel that comprises the broadcast data stream, up to the maximum of 2016 DS0 data channels.

Tone recognition circuit 48 has an array of digital signal processor devices (not explicitly shown) that can be configured to provide tone detection and generation. Tone recognition circuit 48 may be a separate circuit card with plug-in connectors in order to be easily used in a rack containing fiber optic connection unit 14. Alternatively, tone recognition circuit 48 may include multiple circuit cards, or individual components on a single circuit card.

High speed line trunk processor circuit 50 is the primary shelf controller for all of the circuit cards in fiber optic connection unit 14 and provides the interface between fiber optic connection unit 14 and switch 12. High speed line trunk processor circuit 50 contains a microprocessor, a communications interface to all circuit cards of fiber optic connection unit 14, and a communications interface to line trunk manager circuit 26.

High speed line trunk processor circuit 50 may be embodied as a separate circuit card with plug-in connectors in order to be easily used in a rack containing fiber optic connection unit 14. Alternatively, high speed line trunk processor circuit 50 may be multiple circuit cards, or individual components on a single circuit card.

Ingress buses 60 are data buses that are operable to carry a data stream with a predetermined bit structure and at a predetermined frequency from an application card to bus control circuit 44. For example, each ingress bus 60 may comprise a single data stream with 8 parallel bits operating at a frequency of 25.92 MHZ. Other bit structures and frequencies may be used where suitable.

Egress buses 62 are data buses that are operable to carry a data stream with a predetermined bit structure and at a predetermined frequency to an application card from bus control circuit 44. For example, each egress bus 62 may comprise a single data stream with 16 parallel bits operating at a frequency of 51.84 MHZ. Other bit structures and frequencies may be used where suitable.

Common controller 16 is coupled to switch 12 and fiber optic connection unit 14. Common controller 16 is a processor that receives administration, control, and routing data from switch 12 and fiber optic connection unit 14, and generates administration, control and routing data that coordinates the operation of switch 12 and fiber optic connection unit 14. Common controller 16 may alternatively be incorporated within switch 12 or fiber optic connection unit 14.

In operation, telecommunications data from the network is transmitted via optical fiber 18 and received by fiber optic connection unit 14. This telecommunications data is then converted into electrical signals and transmitted through optical interface circuit 40 to application circuit 42 for broadcast switching through bus control circuit 44. The broadcast data is then switched back to application circuit 42 for retransmission through optical fiber 18 via optical interface circuit 40 The broadcast data may also or alternatively be transmitted to matrix interface circuit 46, tone recognition circuit 48, high speed line trunk processor circuit 50, or other suitable circuits to perform specific functions thereon.

Application circuits 42 are operable to receive the broadcast data and to selectively retransmit all or a portion of the data through optical interface circuit 40 to optical fiber 18. In this manner, switching of telecommunications data received from optical fiber 18 may be accomplished by bus control circuit 44 without the need for transmitting the data to switch 12 for switching.

Figure 2:
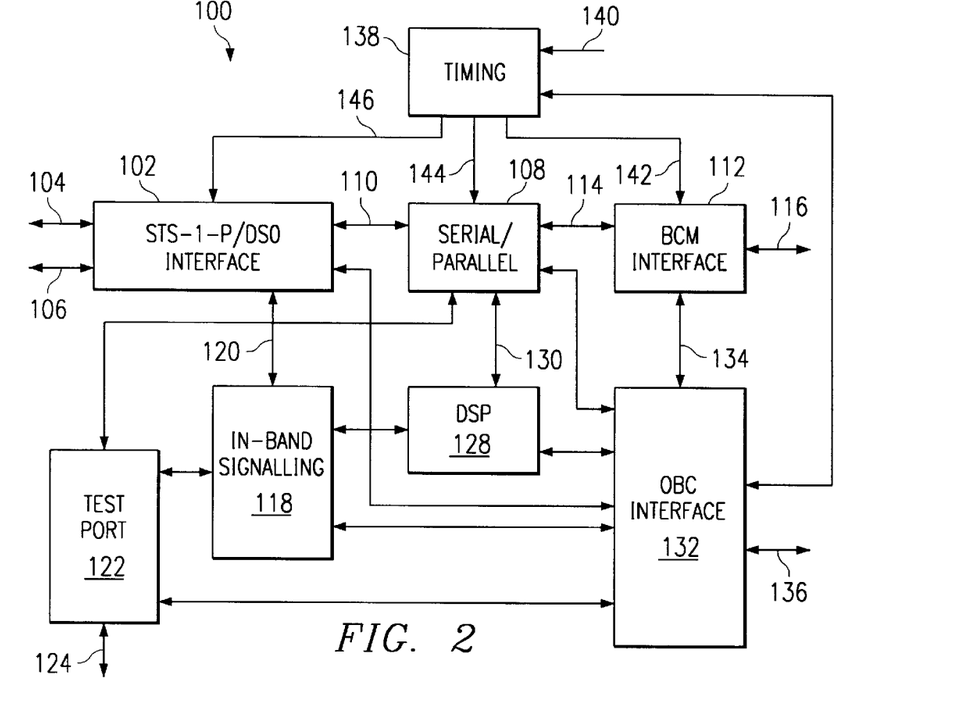
FIG. 2 is a block diagram of a conversion system for converting telecommunications data embodying concepts of the present invention.

FIG. 2 is a block diagram of a conversion system 100 for converting telecommunications data embodying concepts of the present invention. Conversion system 100 may be used in an optical terminator module system such as that shown in FIG. 1. Conversion system 100 may be used to convert between two telecommunications data formats, such as from an STS-1 or an STS-1-P telecommunications data format into a DS0 telecommunications data format, and may be included in a circuit such as application circuit 42 of FIG. 1. An STS-1-P data format is similar to an STS-1 data format, but contains additional proprietary data blocks that are not present in an STS-1 format.

Conversion system 100 includes STS-1-P/DS0 interface circuit 102, serial-to-parallel converter circuit 108, bus control module interface circuit 112, and onboard controller interface 132. These and other components are used to convert STS-1-P format data received from optical interface circuit 40 into DS0 data for transmission to bus interface circuitry (not explicitly shown) of application circuit 42. The bus interface circuit may be a modular bus interface circuit that is configured to be easily used in a variety of application circuits, such as application circuit 42, matrix interface circuit 46, tone recognition circuit 48, high speed line trunk processor circuit 50, or other suitable circuits that interface with bus control circuit 44 over an ingress bus 60 and an egress bus 62.

STS-1-P/DS0 interface circuit 102 comprises two or more discrete components, but may alternatively comprise a single application-specific integrated circuit that performs equivalent functions. STS-1-P/DS0 interface circuit 102 receives redundant STS-1-P signals at 51.84 MHZ over buses 104 and 106 from optical interface circuit 40. These STS-1-P signals may include data in a DS3 payload, an asynchronous VT1.5 payload, or a synchronous VT1.5 payload. STS-1-P/DS0 interface circuit 102 converts the STS-1-P data and its payload into 672 DS0 data channels. The 672 DS0 data channels are transmitted over bus 110 to serial-to-parallel converter circuit 108.

Serial-to-parallel converter circuit 108 is an application-specific integrated circuit, but may alternatively comprise two or more discrete components that perform equivalent functions. Serial-to-parallel converter circuit 108 is a telecommunications data transceiver that is operable to receive the 672 DS0 data channels from STS-1-P/DS0 interface circuit 102, to combine the 672 DS0 channels with 24 DS0 test channels, 96 DS0 tone channels from a digital signal processing circuit (not explicitly shown), and 24 idle DS0 channels, and to convert the serial data to 8-bit parallel data. Serial-to-parallel converter circuit 108 further processes all of the 816 DS0 data channels through a read only memory (not explicitly shown) that is contained within serial-toparallel converter circuit 108. The read only memory is used to adjust the attenuation of each channel by referencing a lookup table of attenuation values. After the attenuation has been adjusted, serial-to-parallel converter circuit 108 transmits the 8-bit parallel data to bus control module interface circuit 112 over 8-bit parallel bus 114.

Bus control module interface circuit 112 is an application-specific integrated circuit, but may alternatively comprise two or more discrete components that perform equivalent functions. Bus control module interface circuit 112 is a telecommunications data transceiver that is used to transmit the 8-bit parallel data received from serial-to-parallel converter circuit 108 to a bus interface circuit (not explicitly shown). As previously described, the bus interface circuit is used to transmit data to bus control circuit 44 of FIG. 1 over ingress bus 60. Likewise, bus control module interface circuit 112 is operable to receive data from the bus interface circuit that has been received from bus control circuit 44 over egress bus 62.

In-band signaling circuit 118 is a field-programmable gate array, but may alternatively comprise other suitable components that perform equivalent functions. In-band signaling circuit 118 is coupled to STS-1-P/DS0 interface circuit 102 by bus 120 and extracts in-band signaling from the data received by STS-1-P/DS0 interface circuit 102. The STS-1-P data received from buses 104 and 106 is transmitted to in-band signaling circuit 118 after individual DS0 data channels have been separated. In-band signaling circuit 118 extracts signaling data and dual tone multi-frequency ("DTMF") data and transmits the extracted data to digital signal processor circuit 128. Likewise, in-band signaling data is generated by digital signal processor circuit 128 and is transmitted back to in-band signaling circuit 118 for insertion into data that is output from STS-1-P/DS0 interface circuit 102 to optical interface circuit 40.

Test port circuit 122 receives external test channels from external interface 124. These channels are transmitted to serial-to-parallel converter circuit 108 via bus 126. Test port circuit 122 may be used to perform tests of conversion system 100.

Digital signal processor circuit 128 is a DSP 56302 100 MHZ 24-bit general purpose digital signal processor, available from Motorola, or other suitable digital signal processors. Digital signal processor circuit 128 is coupled to serial-to-parallel converter circuit 108 via bus 130 and to inband signaling circuit 118. Digital signal processor circuit 128 is operable to receive 96 DS0 data channels, and to perform echo cancellation and dual tone multi-frequency tone recognition operations on the 96 DS0 data channels. The data extracted from the 96 DS0 data channels by dual tone multi-frequency recognition may be encoded into predetermined data locations in the 96 DS0 data channels, encoded into other DS0 data channels, or transmitted directly to other components of conversion system 100.

Onboard controller interface 132 is a field-programmable gate array, but may alternatively comprise other suitable components that perform equivalent functions. Onboard controller interface 132 is coupled to bus control module interface circuit 112 via bus 134 and to all other components of conversion system 100. Onboard controller interface 132 receives data from the onboard controller circuit of the associated application circuit (not explicitly shown) via bus 136. The onboard controller circuit of each application circuit, such as application circuit 42, matrix interface circuit 46, tone recognition circuit 48, high speed line trunk processor circuit 50, or other suitable circuits, may be a modular control circuit computing platform that is operable to receive application card-specific control programming.

System timing circuit 138 receives 51.84 MHZ clock signal from a system timing source, and transmits a 32.768 MHZ timing signal to bus control module interface circuit 112. System timing circuit 138 also transmits a 6.48 MHZ timing signal to STS-1-P/DS0 interface circuit 102, and transmits a 1.544 MHZ timing signal to STS-1-P/DS0 interface 102 and an 8.192 MHZ timing signal to serial-to-parallel converter circuit 108 and bus control module interface circuit 112.

In operation, STS-1-P data is received over buses 104 and 106 at conversion system 100 where it is converted into individual DS0 data channels. These individual DS0 data channels are transmitted by bus control module interface circuit 112 to bus control circuit 44. Following completion of data processing by the bus control circuit 44 or other associated circuits, the data is transmitted back to bus control module interface circuit 112, and ultimately to STS-1-P/DS0 interface circuit 102 for transmission to optical interface circuit 40 of FIG. 1. Thus, conversion system 100 is used to convert data between two data formats in order to interface data transmission equipment to data processing equipment.

Figure 3:
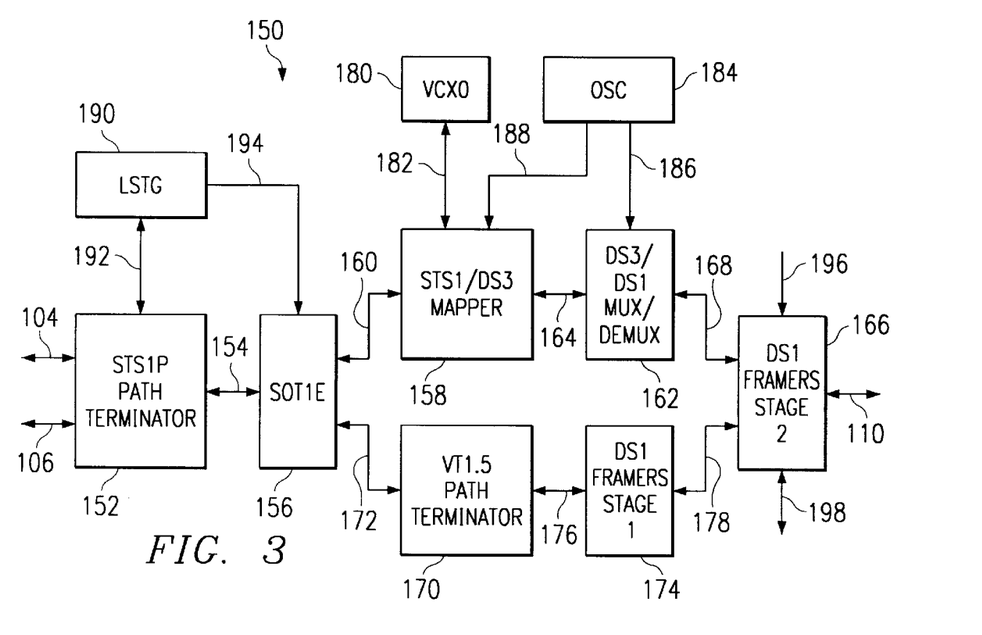
FIG. 3 is a block diagram of an STS-1-P/DS0 interface embodying concepts of the present invention.

FIG. 3 is a block diagram of an STS-1-P/DS0 interface circuit 150 embodying concepts of the present invention. STS-1-P/DS0 interface circuit 150 may be identical to STS-1-P/DS0 interface circuit 102 of FIG. 2, and converts an STS-1-P signal into a plurality of DS0 data channels.

STS-1-P/DS0 interface circuit 150 includes STS-1-P path terminator circuit 152, which is an application-specific integrated circuit, but may alternatively comprise two or more discrete components that perform an equivalent function. STS-1-P path terminator circuit 152 receives inbound 51.84 MHZ clock and data inputs for planes A and B from optical interface circuit 40 of FIG. 1, via buses 104 and 106. STS-1-P path terminator circuit 152 performs per-plane framing and performance monitoring of the signals received from optical interface circuit 40, and performs A/B plane selection based on commands received from theonboard controller circuit (not explicitly shown). STS-1-P path terminator circuit 152 outputs a 51.84 MHZ serial STS-1 clock and data signal to STS-1 path overhead processing interface 156 via bus 154.

STS-1-P path terminator circuit 152 also receives outbound 51.84 MHZ serial STS-1 clock and data inputs from STS-1 path overhead processing interface 156. STS-1-P path terminator 152 then outputs redundant planes of 51.84 MHZ STS-1-P clock and data signals to optical interface circuit 40.

STS-1 path overhead processing interface 156 is an application-specific integrated circuit, but may alternatively comprise two or more discrete components that perform an equivalent function. STS-1 path overhead processing interface 156 receives the inbound 51.84 MHZ serial STS-1 clock and data signal from STS-1-P path terminator circuit 152. STS-1 path overhead processing interface 156 then terminates the STS-1 overhead, and outputs a byte parallel STS-1 synchronous payload envelope at 6.48 MHZ to STS-1/DS3 mapper circuit 158 and VT1.5 path terminator circuit 170. STS-1 path overhead processing interface 156 also receives outbound byte parallel STS-1 synchronous payload envelopes at 6.48 MHZ from STS-1/DS3 mapper circuit 158 or VT1.5 path terminator circuit 170, and originates STS-1 path overhead for the outbound signals. STS-1 path overhead processing interface 156 then outputs a 51.84

MHZ serial STS-1 clock and data signal to STS-1 path terminator circuit 152.

STS-1/DS3 mapper circuit 158 is an application-specific integrated circuit, but may alternatively comprise two or more discrete components that perform an equivalent function. STS-1/DS3 mapper circuit 158 receives an inbound byte-parallel STS-1 synchronous payload envelope at 6.48 MHZ from STS-1 path overhead processing interface 156 via bus 160. STS-1/DS3 mapper circuit 158 then desynchronizes the STS-1 synchronous payload envelope into serial DS3 clock and data signals at 44.736 MHZ.

STS-1/DS3 mapper circuit 158 also receives outbound DS3 clock and data signals at 44.736 MHZ from DS3/DS1 multiplexer-demultiplexer circuit 162. STS-1/DS3 mapper circuit 158 maps the DS3 data into an STS-1 data format. STS-1/DS3 mapper 158 then outputs a byte-parallel STS-1synchronous payload envelope at 6.48 MHZ to STS-1 path overhead processing interface 156.

DS3/DS1 multiplexer-demultiplexer circuit 162 is an application-specific integrated circuit, but may alternatively comprise two or more discrete components that perform an equivalent function. DS3/DS1 multiplexer-demultiplexer circuit 162 receives an inbound DS3 clock and data signal at 44.736 MHZ from the STS-1/DS3 mapper circuit 158 over bus 164. DS3/DS1 multiplexer-demultiplexer circuit 162 then demultiplexes the DS3 data into 28 inbound DS1 clock and data signals at 1.544 MHZ each. DS3/DS1 multiplexer-demultiplexer circuit 162 then outputs the 28 serial DS1 clock and data outputs to DS1 framers stage two circuit 166.

DS3/DS1 multiplexer-demultiplexer circuit 162 also receives 28 outbound DS1 clock and data inputs at 1.544 MHZ from DS1 framers stage two circuit 166, and multiplexes the 28 outbound DS1 data signals into a single serial DS3 clock and data signal at 44.736 MHZ to STS-1/DS3 mapper circuit 158.

Alternatively, if a VT1.5 data signal is carried as payload in the inbound STS-1 signal, then STS-1 path overhead processing interface 156 transmits the inbound data channel via bus 172 to VT1.5 path terminator circuit 170. VT1.5 path terminator circuit 170 is an application-specific integrated circuit, but may alternatively comprise two or more discrete components that perform an equivalent function. VT1.5 path terminator circuit 170 receives an inbound byte parallel STS-1 synchronous payload envelope at 6.48 MHZ from STS-1 path overhead processing interface 156. VT1.5 path terminator circuit 170 then desynchronizes each VT1.5 signal into a serial 1.544 MHZ DS1 clock signal and data signal. In addition, it terminates the VT path overhead, such as a V5 bit, a J2 bit, a Z6 bit and a Z7 bit. VT1.5 path terminator circuit 170 then outputs 28 serial inbound DS1 clock signal, data signals, and in-band signalling signals at 1.544 MHZ to DS1 framers stage 1 circuit 174.

In the outbound direction, VT1.5 path terminator circuit 170 receives 28 serial DS1 clock signal and data signals pairs at 1.544 MHZ from the DS1 framers stage 1 circuit 174. VT1.5 path terminator circuit 170 then originates the VT path overhead, and maps the DS1 data and signaling into an asynchronous or byte-synchronous VT1.5 payload. VT1.5 path terminator circuit 170 then combines the VT1.5 data formats into a byte parallel STS-1 synchronous payload envelope at 6.48 MHZ, which is transmitted to STS-1 path overhead processing interface 156 via bus 172.

DS1 framers stage 2 circuit 166 and DS1 framers stage 1 circuit 174 are each application-specific integrated circuits, but may each alternatively comprise two or more discrete components that perform an equivalent function. DS1 framers stage 2 circuit 166 receives DS1 clock and data pairs from either DS3/DS1 multiplexer-demultiplexer circuit 162 or DS1 framers stage 1 circuit 174. DS1 framers stage 2 circuit 166 then outputs 28 serial DS0 aligned DS1 signals at 2.048 MHZ, for a total of 672 DS0 data signals. These 672 DS0 data signals are transmitted over bus 110. In addition, the 28 serial signalling channels are transmitted at 2.048 MHZ to in-band signaling circuit 118 via bus 198.

In the outbound direction, DS1 framers stage 2 circuit 166 receives 28 serial DS0-aligned DS1 signals at 2.048 MHZ from serial-to-parallel converter circuit 108 via bus 110. Data received from the 28 serial signaling buses from inband signaling circuit 118 via bus 120 is also combined at this stage. The data is then provisioned from 28 DS1 data signals locked to the system 1.544 MHZ clock for output to DS1 framers stage 1 circuit 174 or DS3/DS1 multiplexer-demultiplexer circuit 162.

Figure 4:
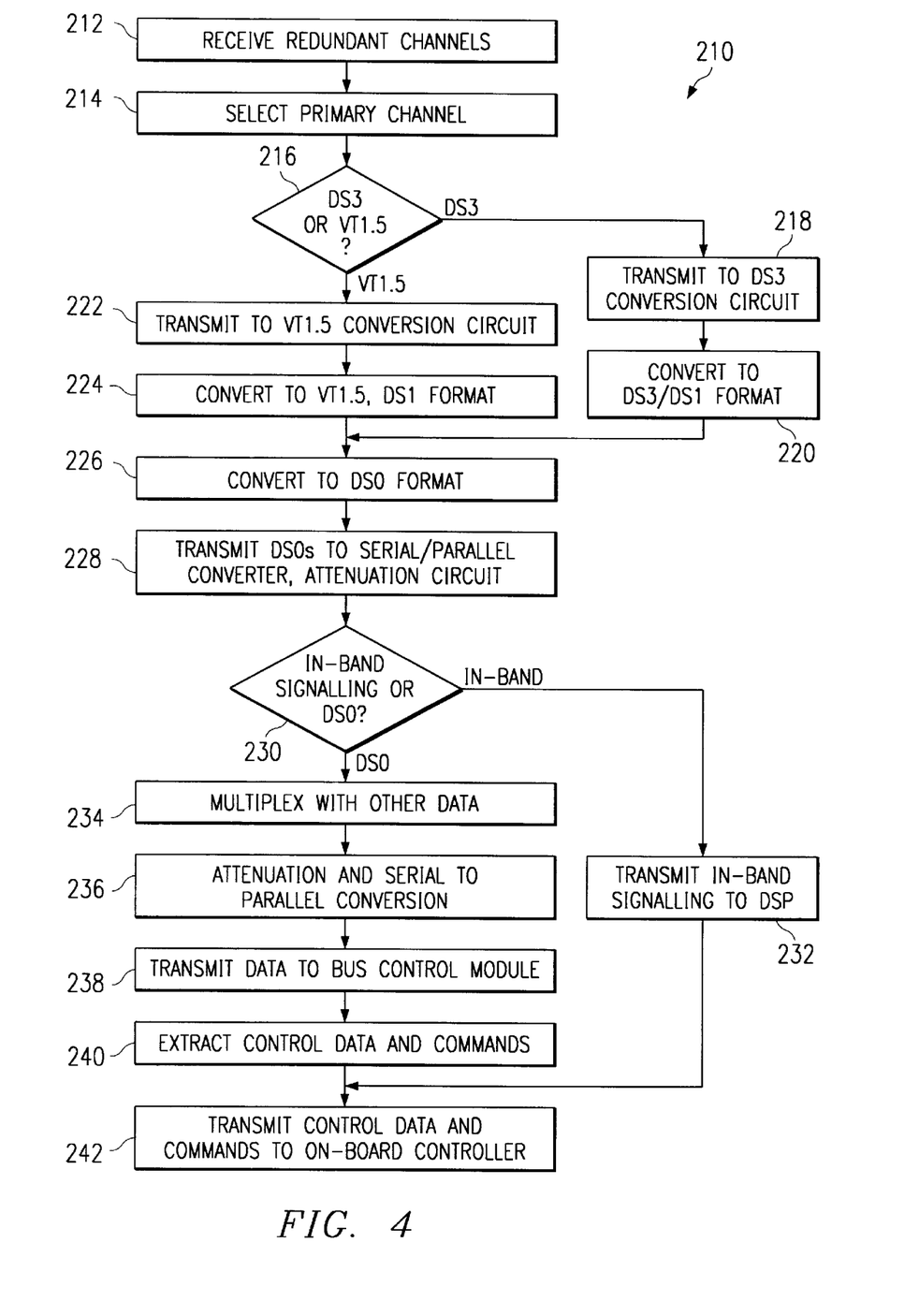
FIG. 4 is a flow chart of a method for converting data in accordance with the teachings of the present invention.

FIG. 4 is a flow chart of a method 210 for converting data in accordance with the teachings of the present invention. Method 210 describes the method by which telecommunications data is received in an STS-1-P data format and is converted into DS0 data signals for switching and other data processing operations.

Method 210 begins at step 212, where two redundant channels of data are received from optical interface circuit 42 in an STS-1-P data format. The STS-1-P data format is similar to the STS-1 data format, but contains additional proprietary data in additional to the standard STS-1 data. These redundant channels of STS-1-P data include embedded data in either a DS3 format, a byte-synchronous VT1.5 format, or an asynchronous VT1.5 data format. The method then proceeds to step 214, where one of the redundant channels is selected to be the primary data channel.

At step 216, it is determined whether the embedded data format is a DS3 format or a VT1.5 format. If the embedded format is a DS3 format, the method proceeds to step 218, where the channel of inbound telecommunications data is transmitted to a DS3-to-DS1 conversion circuit. At step 218, the data is converted from a synchronous payload envelope having an STS-1 format with an embedded data in a DS3 data format to 28 channels of data having a DS1 data format. The method then proceeds to step 226, where the 28 channels of DS1 data are converted to a data stream that includes 672 channels of data, each having a DS0 data format.

If the embedded data format is determined to be either a synchronous VT1.5 or an asynchronous VT1.5 data format at step 216, the method proceeds to step 222, where the channel of inbound telecommunications data is transmitted to a VT1.5-to-DS1 conversion circuit. At step 224, the inbound channel of telecommunications data is converted from an STS-1 synchronous payload envelope into 28 channels of data, each having a VT1.5 data format. These 28 channels of VT1.5 data are then converted into a DS1 data format. The method then proceeds to step 226, where the 28 channels of DS1 data are converted into 672 channels of DS0 data.

At step 228, the 672 channels of DS0 data are transmitted in a second data stream to a serial to parallel conversion and attenuation circuit. In addition, the 672 channels of signalling data are also transmitted to a digital signal processor, which determines at step 230 whether there are any in-band signals embedded in any of the 672 channels of DS0 data. If in-band signaling is present, the method proceeds to step 232, where the in-band signaling is extracted. If in-band signaling is not present at step 230, the method proceeds to step 234.

At step 234 the 672 channels of DS0 data are multiplexed with 24 DS0 test channels, 96 DS0 tone channels from the digital signal processor, and 24 DS0 idle channels to form a stream of 816 DS0 data channels. The method then proceeds to step 236, where the signals are attenuated, such as by referencing a table of attentuation values, and are converted from serial to parallel. The 816 channels of DS0 data are then transmitted at step 238 to bus control circuit 44. The method then proceeds to step 240.

At step 240, the control data, control commands from the second inbound channel of telecommunications data, performance monitoring data, fault monitoring data, and other non-telecommunications payload data are separated from the 816 channels of DS0 data. At step 242, these separated data signals are transmitted to the onboard controller.

Figure 5:
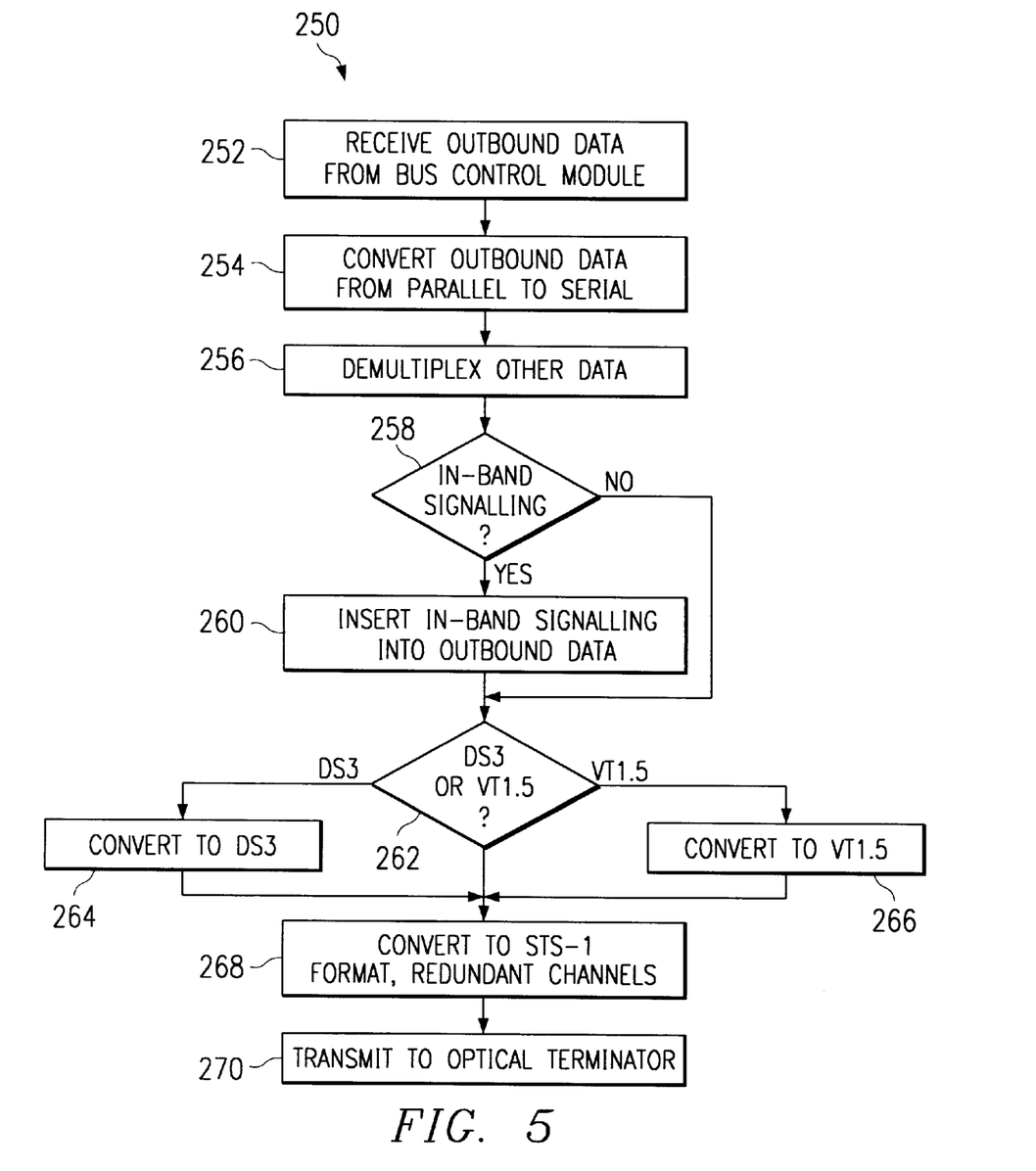
FIG. 5 is a flow chart of a method for converting data in accordance with teachings of the present invention.

FIG. 5 is a flow chart of a method 250 for converting data in accordance with teachings of the present invention. Method 250 describes the method by which telecommunications data is received in a first data format, such as a DS0 format, after it has been switched or otherwise processed, and is converted and combined into STS-1-P signals. Method 250 begins at step 252, where the 816 channels of outbound telecommunications data are received in a DS0 data format from bus control circuit 44. The method then proceeds to step 254, where the 816 channels of DS0 data are converted from a parallel data format to a serial data format. The method then proceeds to sted 256, where ninety-six tone channels and twenty four test port channels are extracted from 816 channels of outbound telecommunications data and are transmitted to a tone processing and recognition circuit and a test port circuit, respectively.

At step 258, it is determined whether in-band signaling must be included with the outbound telecommunications data. If in-band signaling is present, the method proceeds to step 260, where the in-band signaling is inserted into the remaining 672 channels of DS0 data. If no in-band signaling is present at step 258, or after the in-band signaling is inserted at step 260, the method proceeds to step 262, where it is determined whether the 672 channels of DS0 data are to be converted into a DS3 or a VT1.5 embedded data format.

If the embedded data format is a DS3 data format, the method proceeds to step 264, where the outbound data is converted from 672 DS0 data channels into a single DS3 data channel. This step may include an intermediate step of converting the 672 DS0 data signals into 28 DS1 data signals. The method then proceeds to step 268.

If the embedded data format is a VT1.5 data format, the method proceeds to step 266, where the outbound data is converted from 672 DS0 data signals into 28 VT1.5 data signals. This step may include an intermediate step of converting the 672 DS0 data signals into 28 DS1 data signals. The method then proceeds to step 268. At step 268, the DS3 data signal or VT1.5 data signals are converted into redundant channels of an STS-1-P format data signal. These redundant channels of STS-1-P data are then transmitted to optical interface circuit 40 at step 270.

In operation, a channel of data having an STS-1-P data format is received at an STS interface circuit, such as application circuit 42 of FIG. 1. The STS-1-P interface circuit converts the STS-1-P signal into 672 DS0 data signals, regardless of whether the embedded data signal of the STS-1-P channel is in a DS3 data format, an asynchronous VT1.5 data format, or a byte synchronous VT1.5 data format. These 672 DS0 data signals are then transmitted in a data channel to bus control circuit 44 for switching through bus control circuit 44, switching through the associated telecommunications switch, signal processing to remove echo signals or to detect dual tone multi-frequency signals, or for other suitable switching or processing. In addition, 672 DS0 data signals are received from bus control circuit 44 and are converted into an STS-1-P data signal with an embedded DS3, asynchronous VT1.5, or byte synchronous VT1.5 data format.

The present invention provides many important technical advantages. One important technical advantage of the present invention is an optical fiber interface that is operable to simultaneously transfer data channels between an optical signal and an electrical signal while extracting data from the data channels. Another important technical advantage of the present invention is an optical fiber interface that is operable to simultaneously transfer data channels between an optical signal and an electrical signal while inserting data into the data channels.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A data conversion circuit comprising:

a first data transceiver circuit operable to receive a first data channel of data in a first data format having one of a first embedded data format and a second embedded data format and to convert the data into a second data channel having a second data format, the first data transceiver further operable to receive the data from the second data channel in the second data format and to convert the data into the first data channel in the first data format having one of the first embedded data format and the second embedded data format;

a bus interface circuit coupled to the first data transceiver circuit, the bus interface circuit operable to receive the second data channel and to transmit the second data channel to a bus control module circuit, the bus interface circuit further operable to receive the second data channel from the bus control circuit and to transmit the second data channel to the first data transceiver circuit; and an onboard controller interface circuit coupled to the bus interface circuit, the onboard controller interface circuit operable to receive control data and control commands from the bus interface circuit and to transmit the control data and control commands to an onboard controller circuit, the onboard controller interface circuit further operable to receive control data and control commands from the onboard controller circuit and to transmit the control data and control commands to the bus interface circuit.

2. The data conversion circuit of claim 1 wherein the first data format is an STS-1-P data format carrying embedded data in a DS3 data format.

3. The data conversion circuit of claim 1 wherein the first data format is an STS-1-P data format carrying embedded data in a VT1.5 data format.

4. The data conversion circuit of claim 1 wherein the second data format is a DS0 data format.

5. The data conversion circuit of claim 1 further comprising a format converter circuit coupled to the first data transceiver circuit and the bus interface circuit, the format converter circuit operable to receive the second data channel from the first data transceiver circuit and to convert the second data channel from a serial data format to a parallel data format, the format converter circuit further operable to receive the second data channel from the bus interface circuit and to convert the second data channel from the parallel data format to the serial data format.

6. The data conversion circuit of claim 1 further comprising a signal processor circuit coupled to the first data transceiver circuit and the bus interface circuit, the signal processor circuit operable to detect dual tone multi-frequency signals and to cancel echo signals from the telecommunications data.

7. The data conversion circuit of claim 1 further comprising a signaling circuit coupled to the first data transceiver circuit, the signaling circuit operable to detect in-band signaling in the data of the first data channel.

8. A data conversion circuit comprising:
   a first data transceiver circuit operable to receive a first data channel of data in one of a first data format and a second data format and to convert the data into a second data channel having a third data format, the first data transceiver further operable to receive the data from the second data channel in the third data format and to convert the data into the first data channel in one of the first embedded data format and the second embedded data format;
   a bus interface circuit coupled to the first data transceiver circuit, the bus interface circuit operable to receive the second data channel and to transmit the second data channel to a bus control module circuit, the bus interface circuit further operable to receive the second data channel from the bus control circuit and to transmit the second data channel to the first data transceiver circuit; and
   an onboard controller interface circuit coupled to the bus interface circuit, the onboard controller interface circuit operable to receive control data and control commands from the bus interface circuit and to transmit the control data and control commands to an onboard controller circuit, the onboard controller interface circuit further operable to receive control data and control commands from the onboard controller circuit and to transmit the control data and control commands to the bus interface circuit, wherein the first data transceiver circuit further comprises:
      a path terminator operable to receive two or more redundant first data channels and to select one of the two or more redundant first data channels for transmission as the first data channel, the path terminator further operable to receive the first data channel and to transmit the first data channel as two or more redundant first data channels;
      a path selector coupled to the path terminator, the path selector operable to receive the first data channel and to transmit the data in a third data channel if the data has the first data format, the path selector further operable to transmit the data as a fourth data channel if the data has the second data format, the path selector further operable to receive the data from the third and fourth data channels and to transmit the data in the first data channel to the path terminator; and
      a channel framer coupled to the path selector, the channel framer operable to receive the data from the third data channel and the fourth data channel and to convert the data into the second data channel having the third data format, the channel framer further operable to receive the data from the second data channel and to transmit the data as one of the third data channel and the fourth data channel.

9. The data conversion circuit of claim 8 further comprising:
   a first data mapper coupled to the path selector, the first data mapper operable to receive the third data channel from the path selector and to convert the data from the first data format into a fourth data format, the first data mapper further operable to receive the third data channel having the fourth data format and to transmit the data to the path selector in the third data channel and the first data format; and
   a multiplexer-demultiplexer coupled to the first data mapper and the channel framer, the multiplexer-demultiplexer operable to receive the third data channel having the fourth data format from the first data mapper and to transmit the third data channel in a fifth data format to the channel framer, the multiplexer-demultiplexer further operable to receive the third data channel in the fifth data format from the channel framer and to transmit the third data channel in the fourth data format to the first data mapper.

10. The data conversion circuit of claim 9 wherein the fourth data format is a DS3 data format.

11. The data conversion circuit of claim 9 wherein the fifth data format is a DS1 data format.

12. The data conversion circuit of claim 8 further comprising:
   a second path terminator coupled to the path selector, the second path terminator operable to receive the fourth data channel from the path selector and to convert the data from the second data format into a sixth data format, the first data mapper further operable to receive the third data channel in the sixth data format and to transmit the data to the path selector in the third data channel and the first data format; and
   a second channel framer coupled to the second path terminator and the channel framer, the second channel framer operable to receive the fourth data channel in the sixth data format from the second path terminator and to transmit the fourth data channel in a fifth data format to the data channel framer, the second channel framer further operable to receive the fourth data channel in the fifth data format from the data channel framer and to transmit the fourth data channel in the sixth data format to the second path terminator.

13. The data conversion circuit of claim 12 wherein the sixth data format is a VT1.5 data format.

14. The data conversion circuit of claim 1 wherein the first data transceiver, the bus interface, and the onboard controller interface are configured as a single circuit card for use in a data transmission system, with plug-in connectors that allow the card to be easily installed and removed.

15. The data conversion system of claim 1 wherein the first data transceiver, the bus interface, and the onboard controller interface are configured as a single circuit card for use in an optical fiber termination module for interfacing with a telecommunications switch, with plug-in connectors that allow the card to be easily installed and removed.

16. A system for converting data comprising:
   a first data transceiver operable to receive a first data channel of data in a first data format having one of a first embedded data format or a second embedded data format and to convert the data into a second data channel in a second data format, the first data transceiver further operable to receive the data in the second data channel and to convert the data in the second data into the first data channel in the first data format having one of the first embedded data format or the second embedded data format;

a bus interface coupled to the first data transceiver, the bus interface operable to receive the second data channel and to transmit the second data channel to a bus control module, and to receive the second data channel from the bus control module and to transmit the second data channel to the first data transceiver; and an onboard controller interface coupled to the bus interface, the onboard controller interface operable to receive control data and control commands from the bus interface and to transmit the control data and control commands to an onboard controller, the onboard controller interface further operable to receive control data and control commands from the onboard controller and to transmit the control data and control commands to the bus interface.

17. The system for converting data of claim 16 further comprising a serial to parallel converter coupled to the first data transceiver and the bus interface, the serial to parallel converter operable to receive the second data channel from the first data transceiver and to convert the second data channel from a serial data format to a parallel data format, the serial to parallel converter further operable to receive the second data channel from the bus interface and to convert the second data channel from the parallel data format to the serial data format.

18. The system for converting data of claim 16 further comprising a signal processor coupled to the first data transceiver and the bus interface, the signal processor operable to detect dual tone multi-frequency signals and to cancel echo signals from the data.

19. The system for converting data of claim 16 further comprising an in-band signaler coupled to the first data transceiver, the in-band signaler operable to detect in-band signaling in the data of the first data channel.

20. The system for converting data of claim 16 wherein the first data transceiver further comprises:

a data path terminator operable to receive two or more redundant first data channels and to select one of the two or more redundant first data channels for transmission as the first data channel, the data path terminator further operable to receive the first data channel and to transmit the first data channel as two or more redundant first data channels;

a data path selector coupled to the data path terminator, the data path selector operable to receive the first data channel and to transmit the data in a third data channel if the data has the first embedded data format, the data path selector further operable to transmit the data in a fourth data channel if the data has the second embedded data format, the data path selector further operable to receive the data from the third data channel and the fourth data channel and to transmit the data in the first data channel in the first data format having one of the first embedded data format or the second embedded data format to the data path terminator; and a data channel framer coupled to the data path selector transceiver, the data channel framer operable to receive the data from the third data channel and the fourth data channel and to convert the data into the second data channel having the second data format, the data channel framer circuit further operable to receive the data from the second data channel and to transmit the data as one of the third data channel and the fourth data channel.

21. The system for converting data of claim 20 further comprising:

a data mapper coupled to the data path selector transceiver, the first data mapper operable to receive the third data channel from the data path selector transceiver and to convert the data from the first embedded data format into a third data format, the first data mapper circuit further operable to receive the third data channel having the third data format and to transmit the data to the data path selector transceiver circuit in the third data channel and the first embedded data format; and a multiplexer-demultiplexer circuit coupled to the data mapper circuit and the data channel framer circuit, the multiplexer-demultiplexer circuit operable to receive the third data channel having the third data format from the data mapper circuit and to transmit the third data channel in a fourth data format to the data channel framer circuit, the multiplexer-demultiplexer circuit further operable to receive the third data channel in the fourth data format from the data channel framer circuit and to transmit the third data channel in the third data format to the data mapper circuit.

22. The system for converting data of claim 21 further comprising:

a second path terminator circuit coupled to the data path selector transceiver circuit, the second path terminator operable to receive the fourth data channel from the data path selector transceiver circuit and to convert the data from the second embedded data format into a fifth data format, the first data mapper circuit further operable to receive the fourth data channel in the fifth data format and to transmit the data to the data path selector transceiver circuit in the third data channel and the first embedded data format; and a second channel framer circuit coupled to the second path terminator circuit and the data channel framer circuit, the second channel framer circuit operable to receive the fourth data channel in the fifth data format from the second path terminator circuit and to transmit the fourth data channel in a sixth data format to the data channel framer circuit, the second channel framer circuit further operable to receive the fourth data channel in the sixth data format from the data channel framer circuit and to transmit the fourth data channel in the fifth data format to the second path terminator circuit.

23. The system for converting data of claim 16 wherein the first data transceiver, the bus interface, and the onboard controller interface are configured as a single circuit card for use in a data transmission system, with plug-in connectors that allow the card to be easily installed and removed.

24. The system for converting data of claim 16 wherein the first data transceiver, the bus interface, and the onboard controller interface are configured as a single circuit card for use in an optical fiber termination module for interfacing with a switch, with plug-in connectors that allow the card to be easily installed and removed.

25. A method for converting data comprising:

receiving a first inbound channel of data in a first data format having one of a first embedded data format and a second embedded data format;

converting the first inbound channel of data into a second inbound channel of data having a second data format;

transmitting the second inbound channel of data to a bus control module;

receiving a first outbound channel of data having the second data format from the bus control module;

converting the first outbound channel of data into a second outbound channel of data having the first data format and one of the first embedded data format and the second embedded data format.

26. The method of claim 25 wherein receiving a first inbound channel of data comprises:

receiving two or more redundant channels of the first inbound channel of data in a first data format having one of a first embedded data format and a second embedded data format; and selecting one of the redundant channels to be the primary first inbound channel.

27. The method of claim 25 wherein converting the first inbound channel of data comprises:

transmitting the first inbound channel of data to a first conversion circuit if the first inbound channel is carrying data in the first embedded data format; and transmitting the first inbound channel of data to a second conversion circuit if the first inbound channel is carrying data in the second embedded data format.

28. The method of claim 27 further comprising:

converting the first inbound channel of data from the first data format to the first embedded data format if the first inbound channel is carrying data in the first embedded data format;

converting the first inbound channel of data from the first data format to the second embedded data format if the first inbound channel is carrying data in the second embedded data format; and converting the first inbound channel of data from one of the first embedded data format and the second embedded data format into the second inbound channel of data having the second data format.

29. The method of claim 25 wherein transmitting the second inbound channel comprises:

transmitting the second inbound channel of data to a serial to parallel conversion circuit;

converting the second inbound channel of data from a serial format to a parallel format; and transmitting the second inbound channel of data to the bus control module in the parallel data format.

30. The method of claim 29 further comprising:

extracting in-band signaling from the second inbound channel of data; and transmitting the in-band signaling to a controller.

31. The method of claim 29 further comprising performing digital signal processing on the second inbound channel of data to reduce echo signals.

32. The method of claim 29 further comprising:

performing digital signal processing on the second inbound channel of data to detect dual tone multi-frequency signal data.

33. The method of claim 29 further comprising:

extracting control data and control commands from the second inbound channel of data; and transmitting the control data and the control commands to a controller circuit.

34. The method of claim 25 wherein receiving a first outbound channel of data comprises:

receiving the first outbound channel of data in the second data format from the bus control module; and converting the first outbound channel of data from a parallel data format to a serial data format.

35. The method of claim 34 further comprising:

receiving control data and control commands from a controller circuit; and inserting control data and control commands into the first outbound channel of data.

36. The method of claim 25 wherein converting the first outbound channel of data comprises:

converting the format of the first outbound channel of data into one of the first embedded format and the second embedded format;

converting the first outbound channel of data in the one of the first embedded format and the second embedded format into a second outbound channel of data having the first data format.

37. The method of claim 36 further comprising inserting in-band signaling into the first outbound channel of data.

* * * * *